Figures 1, 2, 3:
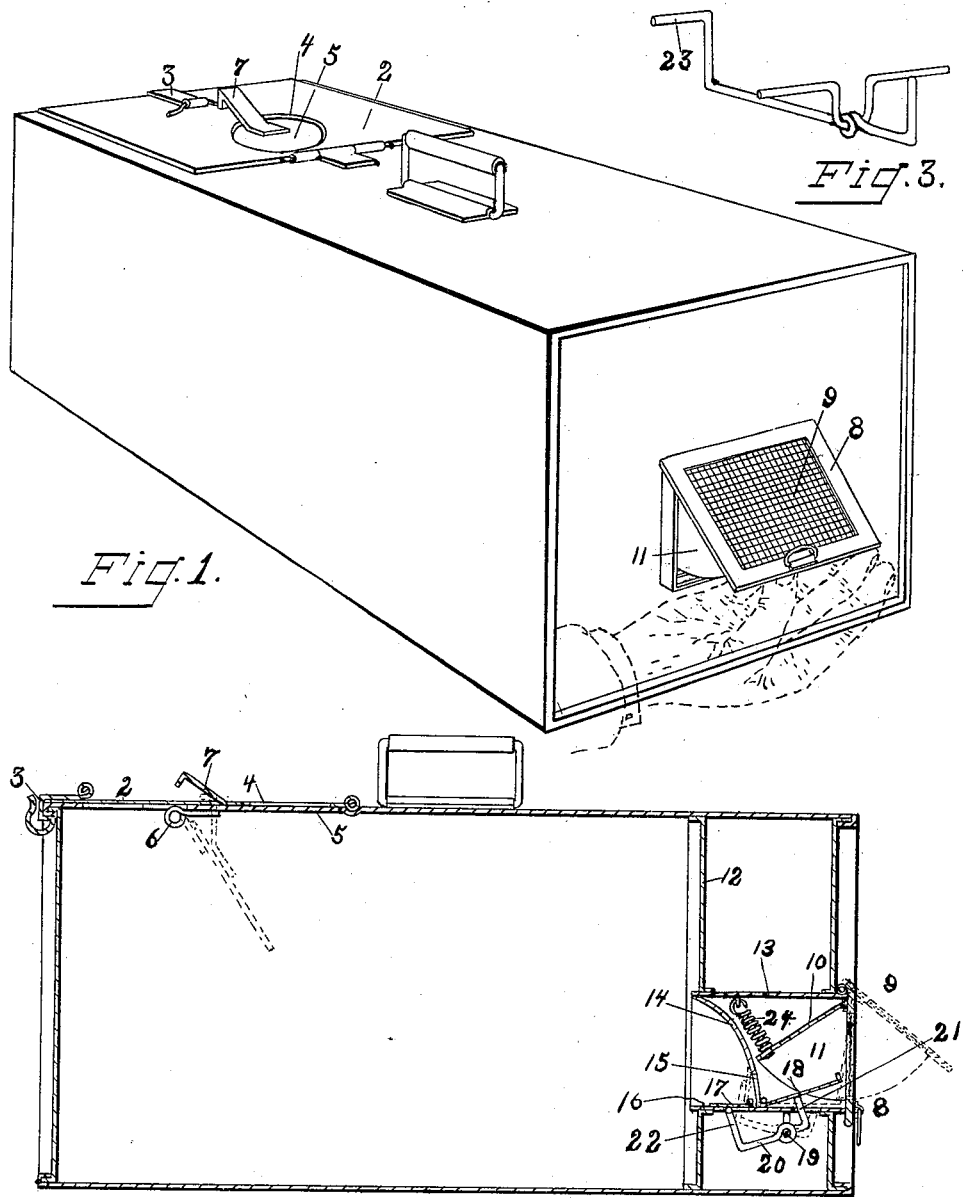

No. 620,805. Patented Mar. 7, 1899.
A. B. RUSS.
BAIT BOX.
(Application filed Mar. 22, 1898.)
(No Model.)

Witnesses;
Will E. Collow
M. C. Gooley

Inventor;
Albert B. Russ
By Paul & Hawley
his attorneys.

UNITED STATES PATENT OFFICE.

ALBERT B. RUSS, OF MINNEAPOLIS, MINNESOTA, ASSIGNOR, BY MESNE ASSIGNMENTS, OF ONE-HALF TO A. D. AXTELL, OF SAME PLACE.

BAIT-BOX.

SPECIFICATION forming part of Letters Patent No. 620,805, dated March 7, 1899.

Application filed March 22, 1898. Serial No. 674,771. (No model.)

*To all whom it may concern:*

Be it known that I, ALBERT B. RUSS, of the city of Minneapolis, county of Hennepin, State of Minnesota, have invented certain new and useful Improvements in Bait-Boxes, of which the following is a specification.

My invention relates to bait pails or boxes for sportsmen; and the object of the invention is to provide a frog pail or box into which frogs may be put and from which they may be taken without risk of the escape or loss of others in the lot.

The invention consists generally in a box or pail having a depressible spring trap or lid that is pressed open in putting a frog into the pail or box and which flies back into place as soon as the frog drops into the box.

Further and more especially, the invention consists in the combination, with the pail or box, of a trap arranged in the wall thereof to take in one frog at a time from within the box and having an outwardly-opening door through which the frog may be taken from the trap.

The invention further consists in details of construction and in combinations of parts, all as hereinafter described, and particularly pointed out in the claims.

The invention will be more readily understood by reference to the accompanying drawings, forming part of this specification, and in which—

Figure 1 is a perspective view of a bait-box embodying my invention. Fig. 2 is a vertical section thereof. Fig. 3 is a detail perspective view of the lever forming part of the trap.

As shown in the drawings, the top of the box has a large door or lid 2, hinged thereon and secured by a suitable latch 3. This lid is opened only for the purpose of placing grass or moss in the box or when cleaning the box. In the lid is a hole 4, and beneath this is the small lid or trap 5, held by a suitable spring 6 and closing tightly against the under side of the lid or door 2. The hook 7 prevents the trap 5 from being depressed too far. In putting a frog into the box the frog is placed on the spring lid or trap 5, and when the same is pressed down the frog will naturally jump or drop down into the box. The lid will instantly close and prevent the escape of the frogs within the box. For getting the frogs out of the box one by one I provide the trap shown in the end of the side of the box. Preferably on the end of the box is the light-door 8, which is either perforated or made of coarse-mesh screen 9. This door is hinged at the top, and to it is attached the hood 10, having the sides 11. Within the box is the partition 12, and between this and the end of the box is the rectangular tube 13, forming a passage from the interior of the box to the door 8. The inner end of the tube 13 contains a preferably curved partition 14, from the lower part of which is an exit-hole 15. Before this hole is a small platform or ledge 16, upon which a frog may rest, and 17 represents a small pivoted door, which normally rests upon the ledge 16, but when raised closes the hole 15. In the forward part of the tube is the normally lifted or raised gravity-platform 18, pivoted at its rear edge. To the under side of the tube I attach the pivot 19, and on this is pivoted the lever 20, provided on its short arm with an upwardly-projecting end 21, extending through an opening in the bottom of the tube and supporting the platform 18. To the longer and heavier arm of the lever I form or attach the upwardly-extending end 22, which when raised through the opening in the bottom of the tube throws up the door 17 to close the hole 15. The lever 20 is preferably a bent wire having its longer arm additionally weighted by a horizontal turn or bend 23, as shown in Fig. 3. When the door 8 is opened, the hood 10 sweeps downwardly and closes the opening and also depresses the platform 18 to close the door 17 and prevent a frog from getting in behind the hood. The door and the hood are returned by a light spring 24, arranged within the tube. When a frog leaps upon the platform 16 and passes through the hole 15, seeking to escape toward the light which shows through the perforated door 8, it will rest upon the platform 18 before the screen-door and will depress said platform 18, thereby throwing down the lever 20 and throwing up the hinged door 17 to close the hole 15 to prevent the entrance of another frog to the trap between the door 8 and the partitions 14 in the tube. When the door is lifted, the frog will be forced off of the platform 18 and will drop into the hand, which is in the position indicated in Fig. 1.

Obviously my invention as herein shown and described admits of various modifications, and I do not therefore confine myself to the specific construction herein set forth.

Having thus described my invention, I claim as new and desire to secure by Letters Patent—

1. The combination, of the bait box or pail, provided with a hole in its top, of a spring-lid arranged within the box and closing said hole, a door provided in said box and a trap within said box and before said door, substantially as described as and for the purpose specified.

2. The combination, with the box or pail, provided with a hinged lid, of a spring lid or trap arranged upon the inner side of said lid and closing a hole or opening therein, and adapted to be depressed, for the purpose specified.

3. The combination, with the box or pail, provided with a perforated door, with a trap provided within the box before said door and having an internal door automatically closed upon the entrance of the frog to the trap, substantially as described.

4. The combination, with the box or pail, of the passage therein, a door closing the outer end of said passage, an inner door closing the inner end of said passage, and a gravity-platform arranged between said doors to operate the inner door automatically, substantially as described.

5. The combination, with the box or pail, of the tube or passage 13, with the door hinged at its upper edge and closing the outer end of said tube, said tube having an opening at its inner end, the normally-opened door therefor, the gravity-platform provided between said doors, and the pivoted lever actuated by said platform to close the door at the inner end of said tube, substantially as described.

6. The combination, with the box or pail, of the tube or passage therein, the door 8 provided with the hood 10, extending into said tube or passage, and means to prevent the exit of more than one frog at a time, substantially as described.

7. The combination, with the box having the spring-trap 5 and the tube 13, of the door 8 having the hood 10, the partition in said tube, the door 17 adapted to close an opening in said partition, the pivoted platform 18, and the pivoted weighted lever 20 normally supporting said platform 18, and when depressed adapted to close said door 17, said platform also adapted to be depressed by said hood 10 when the door 8 is opened, substantially as described.

In testimony whereof I have hereunto set my hand, this 18th day of March, 1898, at Minneapolis, Minnesota.

ALBERT B. RUSS.

In presence of—
C. G. HAWLEY,
M. E. GOOLEY.